March 20, 1962 R. N. RAMIREZ 3,025,555
WINDSHIELD WIPER MECHANISM
Filed Feb. 29, 1960 6 Sheets-Sheet 1
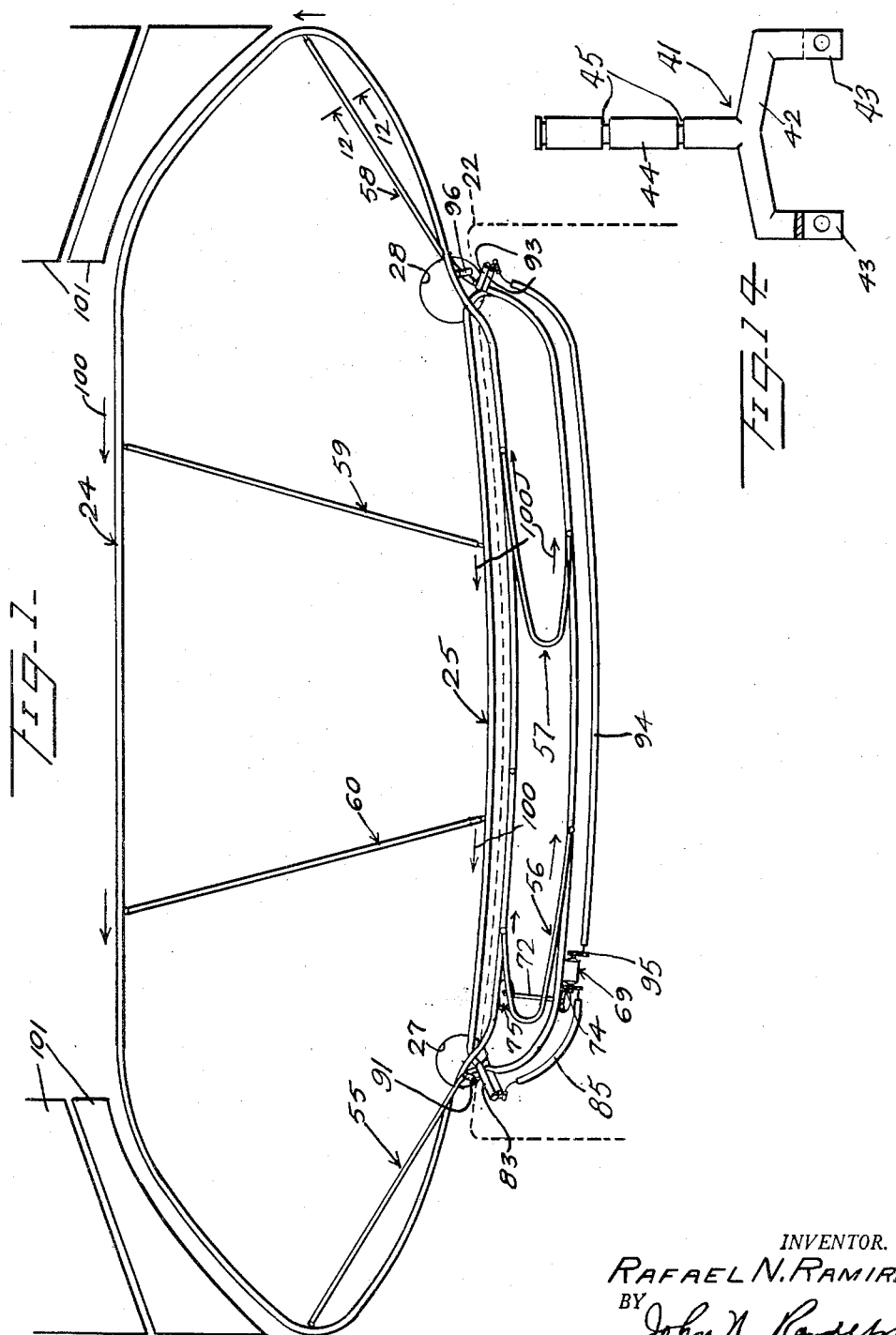
INVENTOR.
RAFAEL N. RAMIREZ
BY John N. Randolph
    atty.

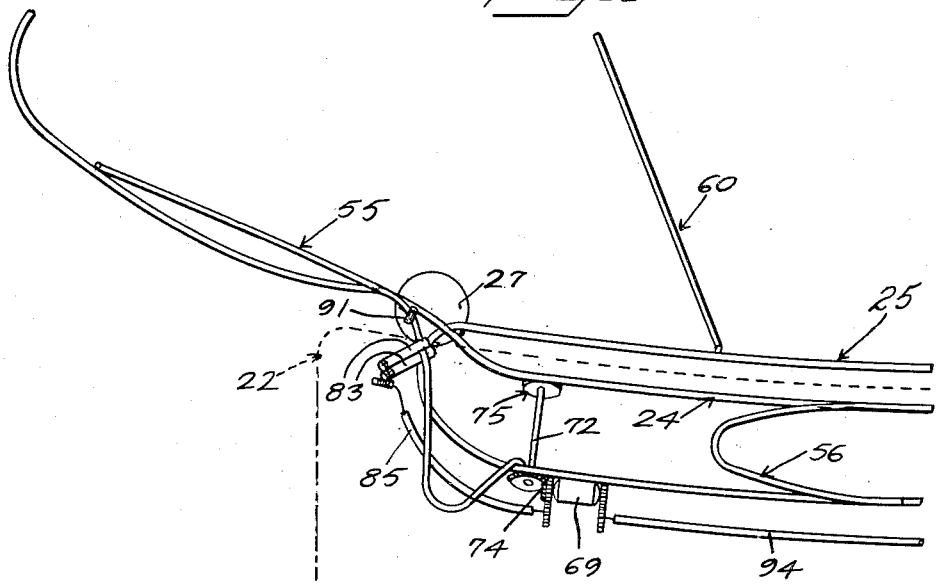
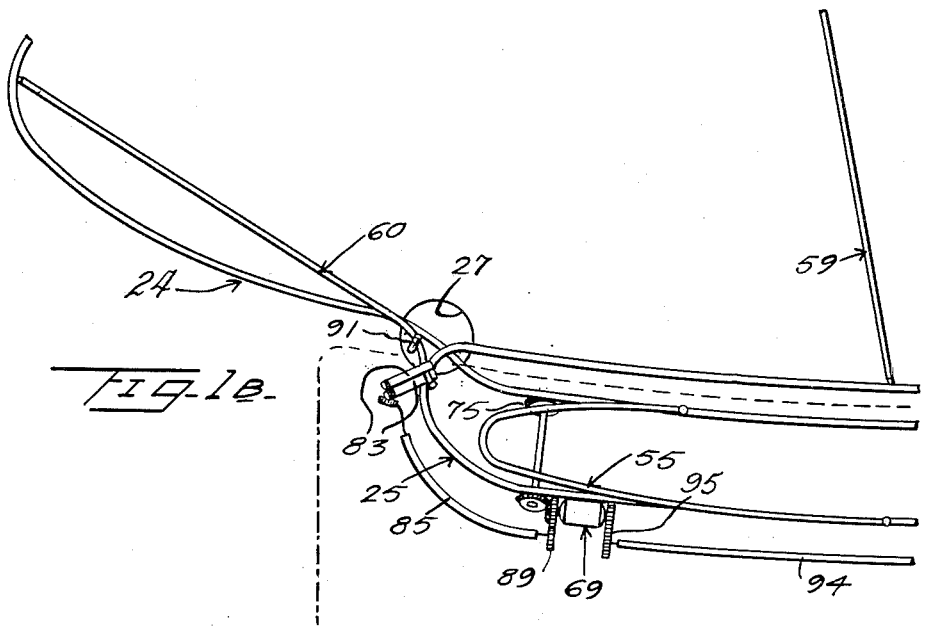

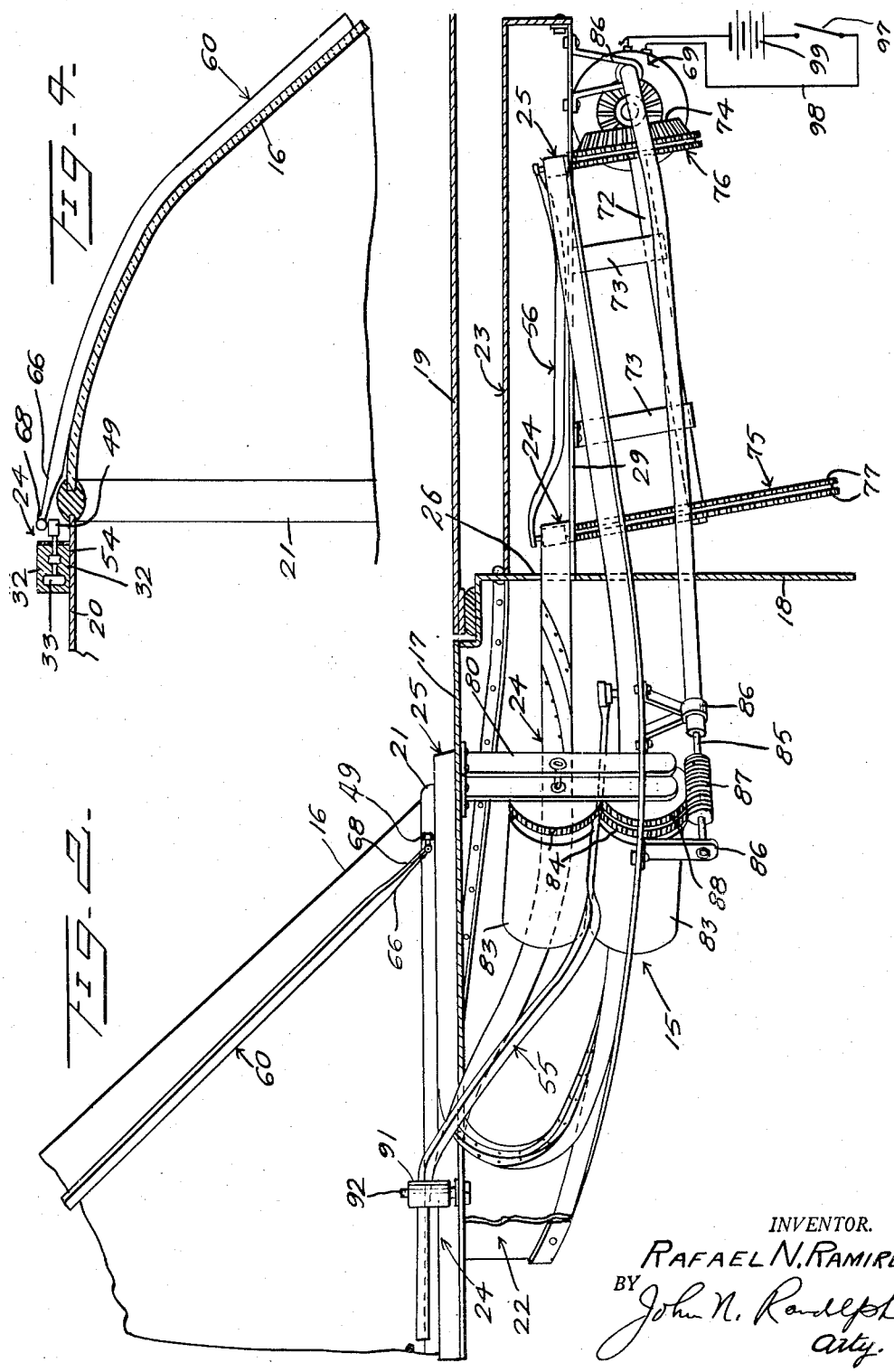

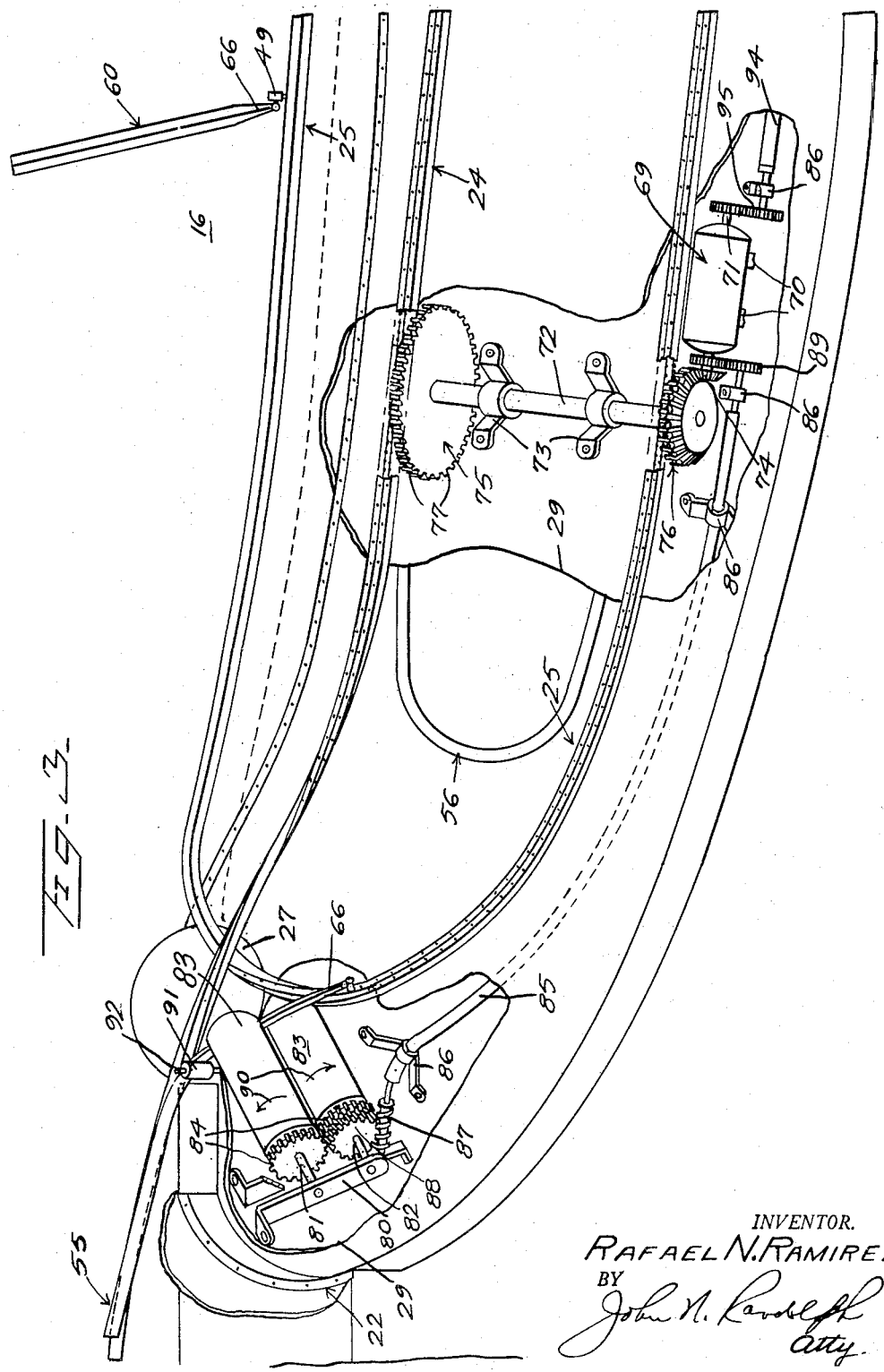

March 20, 1962 R. N. RAMIREZ 3,025,555
WINDSHIELD WIPER MECHANISM
Filed Feb. 29, 1960 6 Sheets-Sheet 5
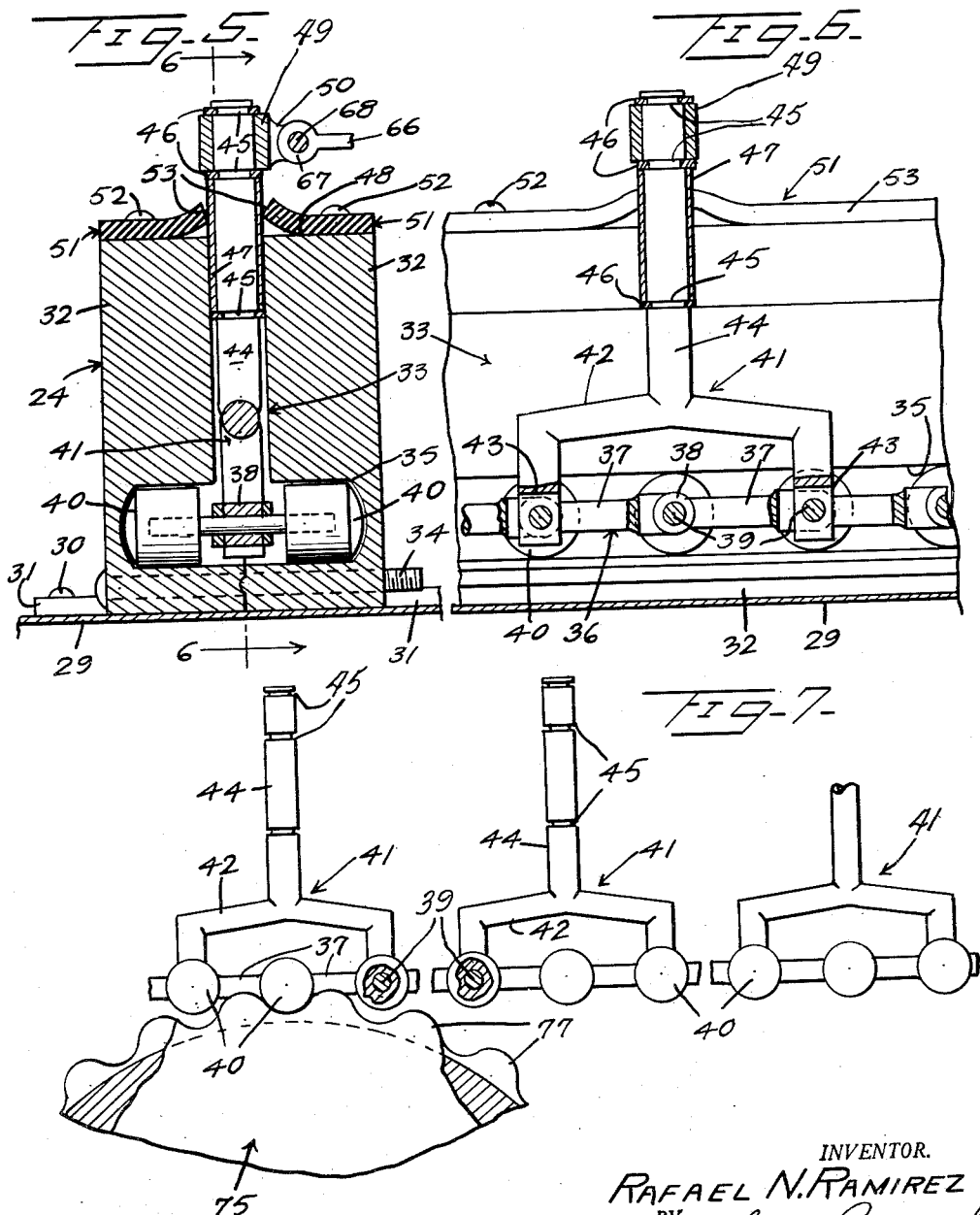
INVENTOR.
RAFAEL N. RAMIREZ
BY John N. Randolph
atty.

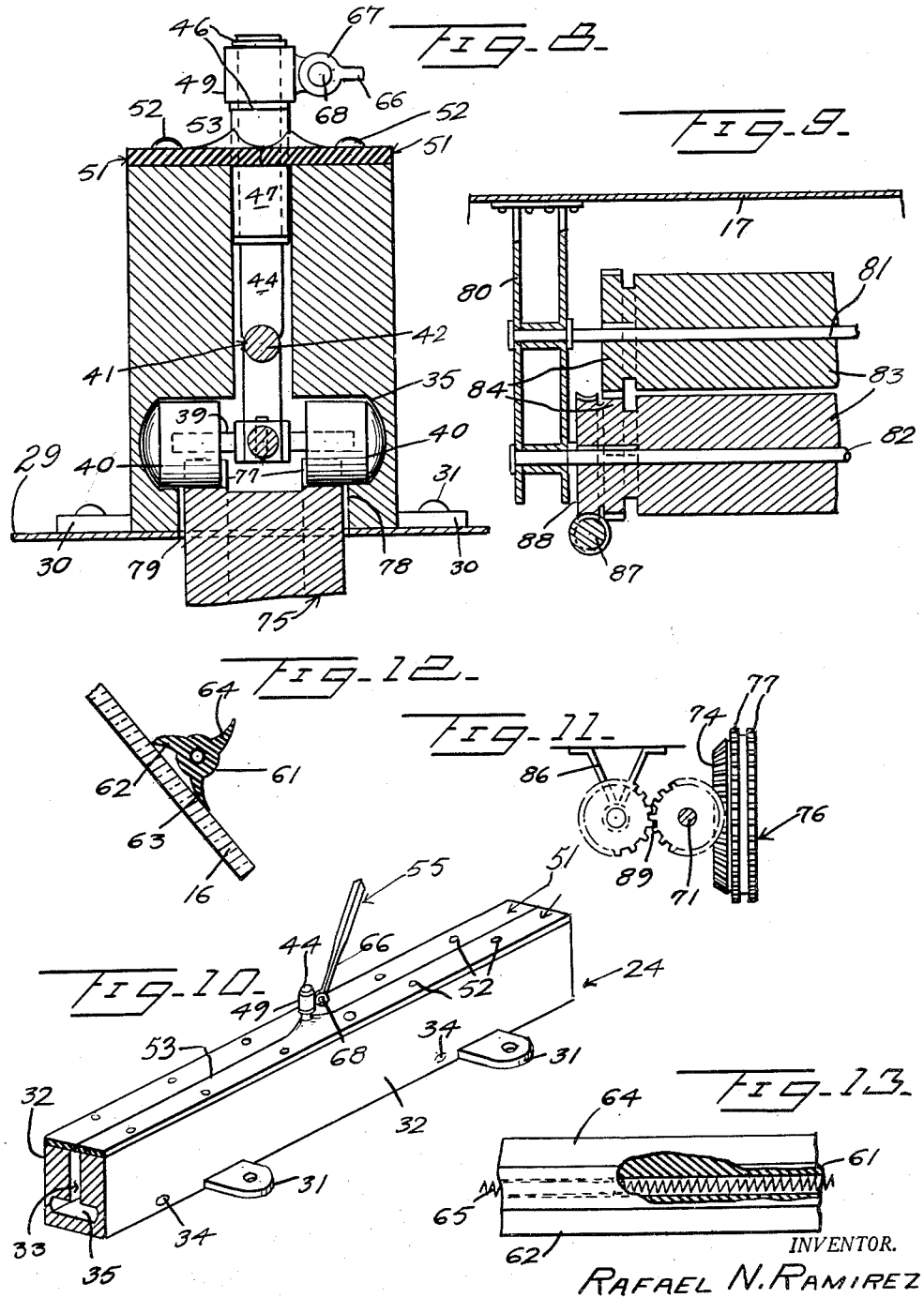

United States Patent Office 3,025,555
Patented Mar. 20, 1962

3,025,555
WINDSHIELD WIPER MECHANISM
Rafael Noguez Ramirez, Cumbres de Maltrata
408 Narvarte, Mexico City, Mexico
Filed Feb. 29, 1960, Ser. No. 11,572
10 Claims. (Cl. 15—250.24)

This invention relates to a novel windshield wiper mechanism primarily adapted for motor vehicles and which is also capable of being utilized in connection with other equipment having windshields, such as boats, aircraft, tractors and the like.

More particularly, it is an object of the present invention to provide a windshield wiping mechanism including at least one wiper blade and conveyor means to which both ends of the blade are attached for conveying the blade across a windshield to be cleaned thereby and so that the blade will substantially traverse the entire area of the windshield.

Still another object of the invention is to provide a windshield wiper mechanism wherein the wiper blade is capable of flexing and stretching to conform to the varying contour of the windshield surface over which it travels to effect a substantially complete wiping of the entire outer surface of the windshield.

A further object of the invention is to provide a windshield wiper mechanism including separate conveyor means to which the two ends of the wiper blade are connected and which conveyor means may be caused to travel at different speeds to effect movement of the two ends of the wiper blade at different speeds to compensate for the different distances traveled by the two wiper ends, each time that the wiper traverses the windshield.

Various other objects and advantages of the invention will hereinafter become more fully apparent from the following description of the drawings, illustrating a presently preferred embodiment thereof, and wherein:

FIGURE 1 is a diagrammatic vew primarily in front elevation illustrating the complete windshield wiper mechanism;

FIGURE 1A is a fragmentary view similar to FIGURE 1, illustrating one end portion of the windshield wiper mechanism with certain of the parts shown in a different position from the position of the parts as seen in FIGURE 1;

FIGURE 1B is a view similar to FIGURE 1A but showing another position of certain of the parts;

FIGURE 2 is an enlarged fragmentary side elevational view, partly in section, illustrating a portion of the windshield wiper mechanism and a portion of an automobile with which said mechanism is associated;

FIGURE 3 is an enlarged fragmentary perspective view of a part of the wiper mechanism, looking generally from right to left of FIGURE 2;

FIGURE 4 is a longitudinal vertical sectional view of a portion of the upper part of the vehicle and showing a part of the windshield wiper mechanism associated therewith;

FIGURE 5 is an enlarged cross sectional view through one of the endless conveyor tracks, showing a part of the endless conveyor which travels therein;

FIGURE 6 is a longitudinal sectional view of a portion of the track and conveyor, taken substantially along the line 6—6 of FIGURE 5;

FIGURE 7 is a fragmentary side elevational view, partly in vertical section, of a part of one of the conveyors, with the track omitted, and showing a part of the sprocket wheel for driving said conveyor;

FIGURE 8 is a view similar to FIGURE 5 but showing a part of the track into which a part of the sprocket wheel extends for engaging and driving the endless conveyor;

FIGURE 9 is an enlarged fragmentary sectional view taken longitudinally through a portion of one of the pairs of friction drive rollers;

FIGURE 10 is an enlarged fragmentary perspective view of a part of one of the endless tracks;

FIGURE 11 is a detailed view illustrating one of the multiple gear drives;

FIGURE 12 is an enlarged cross sectional view of one of the windshield wiper blades, taken substantially along a plane as indicated by the line 12—12 of FIGURE 1, and on an enlarged scale;

FIGURE 13 is an enlarged fragmentary plan view, partly broken away, of a portion of one of the windshield wipers, and FIGURE 14 is a side elevational view, partly in section, of one of the connector elements.

Referring more specifically to the drawings, the windshield wiper mechanism in its entirety and comprising the invention is designated generally 15. To illustrate a preferred application and use of the wiper mechanism 15, a part of an automobile is illustrated in certain of the views including portions of the vehicle windshield, shown for example in FIGURES 2 and 4 at 16, a part of the cowl 17, firewall 18 and hood 19, shown in FIGURE 2, a part of the top 20, shown in FIGURE 4 and portions of the molding 21, between the windshield 16 and vehicle body, as seen in FIGURES 2 and 4.

The windshield wiper mechanism 15 includes a housing portion 22 which is secured to and disposed beneath the cowl 17 and which extends substantially across the vehicle. A second housing portion 23 is secured to and supported by the firewall 18 and is disposed under the rear portion of the hood 19 and likewise extends crosswise of the vehicle.

The wiper mechanism 15 includes two endless tracks 24 and 25. The track 24 is substantially longer than the track 25 and extends around the ends and across the upper edge of the windshield 16, outwardly with respect to but adjacent the molding 21, and has a bottom portion extending through parts of the housings 22 and 23, as seen in FIGURES 2 and 3, and through openings 26 of the firewall 18. Said track 24 extends into the housing 22 through an opening 27 in the cowl 17, which is located adjacent one end of said housing 22, and outwardly through a similar opening 28 in the cowl 17 and which communicates with the other end of the housing 22, as seen in FIGURE 1. The shorter track 25 has an exposed portion extending along the upper side of the cowl 17 between the openings 27 and 28 and along the bottom of the windshield 16. Parts of the endless track 25 also extend through the openings 27 and 28 and said parts cross the parts of the track 24 which extend through said openings and are disposed beneath and spaced therefrom. The remaining part of the track 25 extends through the housings 22 and 23 and through said openings 26 of the firewall 18, each of which accommodates adjacent portions of the two tracks. Parts of the two tracks 24 and 25 are disposed on a bottom wall 29 of the housing 23 and each of the tracks is secured by fastenings 30 to the upper side of said bottom wall 29. The fastenings 30 extend through apertured ears 31 which project laterally from the tracks, as seen in FIGURE 5.

Each track 24 and 25 is formed of a lightweight metal and is primarily composed of two longitudinal halves 32 the adjacent portions of which are recessed to provide an inverted T-shaped channel 33 extending from end-to-end thereof. The halves 32 are detachably secured together by fastenings 34 beneath a wide bottom or inner portion 35 of the channel 33.

An endless chain 36, constituting an endless conveyor, is mounted to travel freely in the wide inner channel portion 35 of each track. Each endless chain 36 includes a plurality of links 37 having overlapping apertured ends 38 connected by axles 39. Rollers 40 are journaled on the ends of the axles 39 and said rollers ride freely in the wide channel portion 35, as seen in FIGURES 5 and 8, and straddle the apertured chain link ends 38.

A plurality of connector elements 41 are carried by each chain 36 and each includes an arch portion 42 having bifurcated ends 43 which are disposed in alignment with one another and which straddle certain of the link ends 38 and are engaged by the axles 39 which extend through said link ends and also through the furcations straddling said link ends. Thus, each connector 41 is connected to two axles 39, as best illustrated in FIGURE 6. Each connector 41 has an arm 44 fixed to and extending outwardly from the intermediate portion of its arch 42 and which projects outwardly through the open upper or outer edge of the channel 33, as seen in FIGURES 5 and 6. The arm 44 is provided with three longitudinally spaced annular grooves 45 for receiving split spring rings 46. An antifriction sleeve or bushing 47 is turnably mounted on the arm 44 between the innermost and intermediate rings 46 and is disposed partially in the channel 33 and partially beyond the side or face 48 of the track, through which said channel 33 opens. As seen in FIGURE 5, the bushing 47 maintains the remainder of the connector 41 out of contact with the walls of the channel 33 so that the connector 41 may move freely within the track carried by the endless conveyor or chain 36. A collar 49 is turnably confined on the outer portion of the arm 44 between the intermediate and outermost rings 46 and is provided with a laterally projecting apertured ear 50. Strips 51 of rubber or other resilient material are secured by fastenings 52 to each of the tracks 24 and 25 and are disposed against the track sides 48. Two such strips 51 are provided for each track side or face 48 and have unsecured adjacent edges 53 which are normally disposed in abutting engagement with one another for closing the opening of the channel 33 to prevent the escape of a lubricant, not shown, therefrom. The bushings 47 of the connectors 41 travel between said edges 53 which yield and spread, as illustrated in FIGURES 5 and 6, to permit the connectors 41 to pass readily therebetween.

As previously described, the parts of the tracks 24 and 25 which rest upon the housing wall 29 are disposed in substantially upright positions so that the sides 48 thereof constitute upper sides of the tracks. However, as best illustrated in FIGURE 3, the tracks 24 and 25 are each twisted adjacent the openings 27 and 28 and the portions of the tracks which extend around the windshield 16 are disposed so that the sides 48 thereof face inwardly or toward the center of the windshield, as best seen in FIGURE 4, and one or more fastenings 54 extend through the lowermost or innermost track half for anchoring the track to a part of the vehicle body surrounding the windshield, and the attaching ears 31 are omitted from the portions of the tracks which are thus secured around the windshield 16. Looking from left to right of FIGURES 2 and 3, the track 24 is twisted in a counterclockwise direction adjacent the opening 27 through approximately three-quarters of a complete twist, and the track 25, adjacent the opening 27, is twisted in the same direction but to a lesser extent, approximately equivalent to one-quarter of a twist. Referring to FIGURE 1, the portion of the track 24 located adjacent the opening 28 is twisted clockwise through approximately three-quarters of a twist, looking from left to right toward said opening 28, and the portion of the track 25 which passes under the track 24, at the opening 28, is twisted in the same direction approximately one-quarter of a complete turn.

As illustrated in the drawings, the windshield wiper mechanism 15 is shown provided with six windshield wiper blades 55, 56, 57, 58, 59 and 60, all of which are of the same construction. As best seen in FIGURES 12 and 13, each wiper blade includes a tubular body 61 formed of rubber having three outwardly projecting vanes or blade elements 62, 63 and 64 which are approximately equally spaced circumferentially relative to one another and which extend longitudinally of the body 61. Said vanes or blade elements taper in thickness toward their outer edges and are preferably curved slightly, all in the same direction. The body 61 has a central bore through which a contractile spring 65 extends. The wiper body 61 terminates in restricted ends 66 each of which has a terminal eye 67. The blade elements 62, 63 and 64 terminate adjacent said restricted ends 66 and the ends of the springs 65 are anchored to the restricted ends 66. The eyes 67 are secured by fastenings 68 to the apertured ears 50 for connecting one end of each wiper blade to a connector 41 which travels in the track 24 and the other end of said wiper to a connector 41 which travels in the track 25. Thus, the chain of each track is provided with six connectors 41. The eyes 67 may be suitably hardened so that they will not become disengaged from the fastenings 68 and so that said eyes 67 can turn on the fastenings 68 to allow the end portions 66 to pivot relative to the collars 49 about axes disposed at right angles to the axes of rotation of said collars on the arms 44. Thus, each wiper blade end can pivot about two axes disposed at right angles to one another relative to the connector 41 to which said end is connected.

A small electric motor 69 is secured to the underside of the forward portion of the bottom wall 29 by suitable mounting brackets 70 and has a rotary driven armature shaft 71 which projects from both ends thereof. A shaft 72 is journaled in bearing brackets 73 which are likewise secured to the underside of the wall 29 for mounting said shaft 72 beneath the wall 29 and crosswise of portions of the tracks 24 and 25 which extend over said shaft 72, and also crosswise of the motor shaft 71. One end of the motor shaft 71 is connected by meshing bevel gears 74 to an adjacent end of the shaft 72 for driving the shaft 72 at a reduced speed relative to the shaft 71. A sprocket wheel 76 is secured to the shaft 72, adjacent the bevel gear drive 74, and a larger sprocket wheel 75 is secured to the other end of said shaft 72. Each of said sprocket wheels has two transversely spaced rings of sprocket teeth 77 extending around the periphery thereof. As best seen in FIGURE 8, each track 24 and 25 is provided with an opening 78 which opens into a portion of the transversely enlarged part 35 of its channel and which opens outwardly through and communicates with an opening 79 of the wall 29. A part of the periphery of the sprocket wheel 75 is accommodated in the opening 78 of the track 24 and the opening 79 which registers therewith, and a part of the periphery of the sprocket wheel 76 is similarly accommodated in the opening 78 of the track 25 and the opening 79 which registers therewith. Thus, portions of the rings of sprocket wheel teeth 77 of the two sprocket wheels extend into the channel portions 35 of the two tracks. The rollers 40 of the chains 36 engage between the sprocket wheel teeth 77, as seen in FIGURES 7 and 8, so that the chain 36 of the track 24 is driven by the sprocket wheel 75 and the chain 36 of the track 25 is driven by the sprocket wheel 76. The sprocket wheel 75 is larger than the sprocket wheel 76 and has a greater number of sprocket teeth 77 so that the chain 36 of the track 24 is driven faster than the chain 36 of the track 25 to enable both chains to complete the circuit of the tracks in the same amount of time or simultaneously.

As best illustrated in FIGURES 2, 3 and 9, a bearing bracket 80 is fixed to and depends from the cowl 17, adjacent one end of housing 22, and supports and journals two shafts 81 and 82, corresponding ends of which engage in the bracket 80. The shaft 82 is disposed beneath and spaced from the shaft 81. Rollers 83 are fixed to the opposite unsupported ends of said shafts 81 and 82 and have adjacent peripheral portions disposed in slightly spaced apart relation to one another. Meshing gears 84 are fixed to the shafts 81 and 82 between the rollers 83 and the bearing 80 for causing said shafts to turn simultaneously in opposite directions. A flexible shaft 85 is supported beneath the wall 29 by hanger brackets 86 which are fastened to and depend from said wall. A worm 87 is secured to one end portion of the flexible shaft 85 and meshes with a worm wheel 88 which is fixed to the shaft 82, between the gear 84 thereof and the bearing 80. The other end of the flexible shaft 85 is connected to the motor shaft 71 by meshing gears 89, one of which gears is fixed to the shaft 71 between the motor 69 and the bevel gear drive 74. The motor shaft 71 drives the shaft 72 clockwise, as seen in FIGURE 3, and in addition drives the shafts 81 and 82 and the rollers 83 fixed thereto in the directions as indicated by the arrows 90 of this view. The unsecured ends of the shafts 81 and 82 are located adjacent the opening 27 and between portions of the tracks 24 and 25 which cross at said opening. A guide roller 91 is journaled on a post 92 which is fixed to and rises from a part of the cowl 17. The roller 91 is located adjacent the opening 27 and adjacent a part of the track 24, for a purpose which will hereinafter be described.

As seen in FIGURE 1, a second pair of rollers 93, corresponding to the rollers 83, are mounted in the housing 22 adjacent the opening 28 in the same manner as the rollers 83. The rollers 93 are driven by a second flexible shaft 94 having a driving connection with the shaft of the lower roller 93, corresponding to the connection of the flexible shaft 85 to the shaft 82. The flexible shaft 94 is supported beneath the wall 29 by additional brackets 86, as seen in FIGURE 3, and is driven by the motor shaft 71 by means of meshing bevel gears 95, one of which is fixed to the other end of the motor shaft 71. A second guide roller 96, corresponding to the guide roller 91, is disposed adjacent the opening 28.

Any conventional type of electric switch 97, as seen in FIGURE 2, can be interposed in the electric circuit 98 by which the electric motor 69 is connected to a current source such as a storage battery 99 of the vehicle. The switch 97 may be located on the vehicle dashboard or in any other location accessible to the vehicle operator. As previously stated, when the motor 69 is energized the shaft 72 and sprocket wheels 75 and 76 turn clockwise as seen in FIGURE 3 so that the endless chains 36 move counterclockwise in both tracks 24 and 25, as indicated by the arrows 100 in FIGURE 1. The ends of the windshield wiper blades travel with the connectors 41 relative to the tracks 24 and 25 as the chains 36 move therein and each wiper assumes the position of each of the wipers 55 to 60, as shown in FIGURE 1, during each circuit of travel of the two chains.

The wiper 55 is shown completing its travel from right to left of FIGURE 1 across the windshild 16 and the end thereof, moving along the track 25, has passed through the opening 27 into the housing 22 and under a part of the track 24 and a part of said wiper 55 has been drawn into the space between the rollers 83, as better illustrated in FIGURE 3. The rollers 83 rotate at a speed sufficient to pull the wiper 55 and to feed it toward the end carried by the track 25 and at a speed so that a pull is not exerted on the other end of the wiper which is traveling along the track 24. In this way the wiper 55 is prevented from buckling or lapping on the windshield 16 but rather is drawn into and caused to lap within the housing 22, as seen in FIGURE 1A. The roller 91 functions to guide the wiper blade 55 around the underside of the track 24 as it approaches and moves through the opening 27. As the other end of the blade 55, carried by one of the connectors 41 of the track 24, moves through the opening 27 it passes around the underside of the track 24 due to the twist of said track, adjacent the opening 27, as clearly illustrated in FIGURE 3. The wiper 55 is shown during its travel through the housing 23 in FIGURE 1B, and in which position the end of the wiper, traveling along the track 25 is still in advance of the other end thereof which is traveling along the track 24. However, as the wiper 55 approaches the opening 28 the end thereof moving along the track 24 will assume a position in advance of the other end, as illustrated by the position of the wiper 57 in FIGURE 1. Thereafter this leading end will pass outwardly of the opening 28 and under the twisted part of the track 24, located adjacent the opening 28 and a part of said wiper will engage the guide roller 96 while another part thereof will become engaged between the rollers 93. The rollers 93 are turning in directions corresponding to the directions of rotation of the complementary rollers 83 for feeding the wiper outwardly through the opening 28 and to prevent the wiper from bunching up within the housing 22 and adjacent the opening 28. As the end of the wiper 55, carried by a connector 41 of the track 25, passes the rollers 93, said wiper will be disengaged from the rollers and the last mentioned wiper end will move out of the housing 22 through the opening 28. At this time the wiper 55 will be in approximately the position of the wiper 58 of FIGURE 1. Thereafter, said wiper 55 will travel across the windshield 16 from right to left as seen in FIGURE 1 from the position of the wiper 58 to the position of the wiper 59 and thereafter to the position of the wiper 60, and will then continue until said wiper 55 has returned to the initially described position of said wiper as shown in FIGURE 1.

It will be understood that each of the other wipers 56, 57, 58, 59 and 60 will move in the same manner as the wiper 55 during each circuit of movement. Each of the wipers is flexible and also elastic so that the wipers can stretch where necessary to extend across wider portions of the windshield and will still remain taut in engaging narrow portions thereof or when the wiper ends are disposed more nearly in transverse alignment. The wiper blades may also flex to conform to the contour of the outer surface of the windshield even where the windshield is curved considerably, as seen in FIGURE 4, and is rounded and curved rearwardly substantially at its ends, as illustrated in FIGURES 1 and 2. Thus, substantially the entire area of the outer surface of the windshield will be wiped by each windshield wiper during its movement from right to left from the position of the wiper 58 in FIGURE 1 to the position of the wiper 55. The front door windows 101 are illustrated diagrammatically in FIGURE 1 to indicate that the ends of the windshield can curve rearwardly to a considerable extent and still be wiped by the wiper blades in their travel from end-to-end across the windshield.

As illustrated in FIGURE 12, two of the vanes or blade elements of each wiper blade contact the outer surface of the windshield 16. As illustrated in this view the blade element 62 engages the windshield as the leading blade element and the blade element 63 contacts the windshield as the trailing blade element, so that a dual wiping action is accomplished by each wiper blade. The other outwardly extending blade element 64 functions to prevent any moisture being deflected by the leading blade element 62 over the windshield wiper blade.

While the windshield wiper mechanism 15 has been illustrated as provided with six windshield wiper blades equally spaced from one another, it will be readily apparent that one such wiper blade only might be employed or any desired number. Furthermore, the spacing of the wiper blades would not have to be as shown and said wiper blades could be connected to the chains 36 by connectors 41 grouped so that all of the wiper blades could be within the housings 22 and 23 or in the positions of the wiper blades 55, 56, 57 and 58, as seen in FIGURE 1, at one point of travel of the chains 36, so that the mechanism could be stopped with the wipers thus positioned and so that none of the wiper blades would provide any obstruction to the field of vision through the windshield 16.

Various modifications and changes are contemplated and may be resorted to, without departing from the function or scope of the invention as hereinafter defined by the appended claims.

I claim as my invention:

1. A windshield wiper mechanism comprising a first endless track and a second endless track, a first endless conveyor movably disposed in the first track, a second endless conveyor movably disposed in the second track, driving means connected to and driving said endless conveyors simultaneously in the same direction in the tracks thereof, a windshield wiper blade, means connecting one end of the wiper blade to the first conveyor, means connecting the other wiper blade end to said second conveyor, said first track having a portion extending around the ends and upper part of a windshield, said second track having a portion extending along the bottom edge of the windshield, and said wiper blade ends being caused to move by said endless conveyors with said connector means in one direction only along said track portions whereby the windshield wiper will traverse substantially the entire area of the windshield during each circuit of travel of the endless conveyors in the tracks thereof.

2. A windshield wiper mechanism as in claim 1, said driving means including a rotary driven shaft, a first sprocket wheel and a second sprocket wheel fixed to said shaft, said endless conveyors comprising chains, said first sprocket wheel engaging and driving said first conveyor chain, said second sprocket wheel engaging and driving said second conveyor chain.

3. A windshield wiper mechanism as in claim 2, said first track and second track including other portions disposed substantially parallel to one another and having openings accommodating portions of said sprocket wheels for engagement with said conveyor chains.

4. A windshield wiper mechanism as in claim 3, said first track and the first conveyor chain being longer than the second track and second conveyor chain, and said first sprocket wheel being larger than the second sprocket wheel for driving the first conveyor chain faster than the second conveyor chain and at a speed such that both conveyor chains will complete a circuit of travel of the tracks thereof simultaneously.

5. A windshield wiper mechanism as in claim 4, means providing a housing for said last mentioned track portions including openings through which parts of the tracks pass, a first rotary driven means for engaging and drawing the wiper through one of said openings and a second rotary driven means for engaging and feeding the wiper outwardly through the other of said openings.

6. A windshield wiper mechanism as in claim 1, said wiper blade being flexible and elastic and including a plurality of longitudinally extending circumferentially spaced vanes forming blade elements including two blade elements positioned in contact with the windshield as the wiper blade moves from end-to-end of the windshield.

7. A windshield wiper mechanism as in claim 1, and a plurality of additional windshield wiper blades and additional means connecting the ends of said additional wiper blades to said endless conveyors whereby each of the additional wiper blades is connected to each of the endless conveyors, said means connecting the wiper blade ends to the endless conveyors of the two tracks being disposed in spaced apart relation to one another.

8. A windshield wiper mechanism as in claim 1, each of said tracks being provided with a channel for accommodating the endless conveyor thereof and the means connecting said endless conveyor to the wiper blade, said endless conveyors each comprising a chain including links and axles connecting said links, and rollers mounted on the ends of said axles and disposed to roll in the track channel for supporting the chain.

9. A windshield wiper mechanism as in claim 8, each of said means connecting the endless conveyor and wiper blade comprising an arm having a bifurcated inner end connected to two of the chain axles and an outer end extending outwardly from the track.

10. A windshield wiper mechanism as in claim 9, and said means connecting the endless conveyors and wipers each additionally including a collar swivelly mounted on the outer end of the arm and pivotally connected to the wiper blade end for swinging movement of said wiper blade end relative to the collar about an axis disposed crosswise of the axis of the collar.

References Cited in the file of this patent

UNITED STATES PATENTS

| | | |
|---|---|---|
| 1,729,069 | Formoso | Sept. 24, 1929 |
| 1,865,158 | Acierno | June 28, 1932 |

FOREIGN PATENTS

| | | |
|---|---|---|
| 662,718 | Germany | June 23, 1938 |